United States Patent Office 3,538,061
Patented Nov. 3, 1970

3,538,061
PREPARATION OF POLYMERS AND COPOLYMERS OF VINYL CHLORIDE
Georgette Steinbach Van Gaver, Paris, and Yves Fagnoni, Saint-Auban, France, assignors to Produits Chimiques Pechiney-Saint-Gobain, Paris, France
No Drawing. Filed Feb. 20, 1967, Ser. No. 617,065
Claims priority, application France, Feb. 23, 1966, 50,768
Int. Cl. C08f 3/30, 15/08
U.S. Cl. 260—78.5    6 Claims

ABSTRACT OF THE DISCLOSURE

Vinyl chloride is polymerized in suspension alone or with compatible monomers in the presence of alpha-halogenolauroyl peroxides as catalysts in a low temperature process.

---

This invention relates to the polymerization of vinylic monomers, especially vinyl chloride, in aqueous suspension, in the presence of novel catalysts and under conditions of temperature and pressure favorable to the polymerization.

It has been proposed heretofore to use lauroyl peroxide as a catalyst for the initiation of polymerization of vinylic monomers but its region of activity was between 50 to 70° C. which only produced ordinary polymers of medium or light molecular weight. It is desirable to produce heavier polymers than that process permitted.

It is known that polymers produced at low temperature, for example below 20° C., are of greater molecular weight but the catalysts available for use at such temperatures have not been altogether satisfactory. It is an object of the invention to prepare such polymers, of higher molecular mass than can be obtained at 50 to 70° C., to produce them at low temperatures, and with the novel properties of flexibility, resistance to flexing, resistance to solvents, and thermal stability.

The present invention produces polymers, within which terms is included copolymers, comprising polyvinyl chloride, at temperatures lower than those at which lauroyl peroxide is efficient.

The objects of the invention are accomplished, generally speaking, by a method of polymerizing vinyl chloride which comprises suspending the vinyl chloride in an aqueous solution, mixing therewith a catalyst for polymerization having the formula

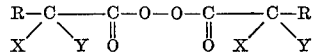

in which X is one of a group consisting of hydrogen and halogen, and Y is halogen, halogen preferably being chlorine, and R is saturated aliphatic of 10 carbon atoms, and polymerizing the monomer under conditions of temperature and pressure sufficient to keep the monomer in suspension and to promote the polymerization.

The polymerization is carried out in aqueous suspension at temperatures between about 5° C. and 35° C., preferably between about 10 and about 25° C., under pressure sufficient to keep the volatile vinyl chloride in suspension.

The process is applicable to vinyl chloride alone or with compatible comonomers such as organic vinyl esters, for instance the acetate, laurate and stearate; the vinyl ethers; the halogenoethylenes, for instance dichloroethylene 1,1 and 1,2, trichloroethylene and monochlorotrifluoroethylene; acrylonitrile; propenyl chloride; chloroprene; and the esters of fumaric acid.

Among the alpha-halogenolauroyl peroxides representative of this class of catalysts are alpha-chlorolauroyl peroxide and alpha-chlorolauroyl peroxides which carry one or more halogens in other parts of the carbon chain. Thus, both X and Y may be halogens and other halogens may be found in the aliphatic radical. The catalysts of this class can be used singly or in combinations. The different members may be added to the reaction medium during the polymerization either simultaneously or in fractions, or independently one of the other, or at different temperature levels in order to obtain substances of wider molecular distribution.

The catalysts are advantageously employed in proportions which furnish from about .001% to about .1% of active oxygen by weight of the monomers employed. A preferred range is between .006 and .015% by weight. The catalysts of this invention are very efficient in the temperature range between 0 and 35° C. but it is to be understood that to obtain optimum efficiency from a particular catalyst one will select the operating zone with some care as a function of the nature, the number, and the position of the substituents appearing in the molecule of the alpha-halogenolauroyl peroxide selected. For example, when alpha-chlorolauroyl peroxide itself is used the preferred temperature range is between 10° and 25° C.

This novel process of polymerization in suspension is equally applicable to all the different techniques which have been developed for polymerization in suspension.

The products produced by this process are better than those heretofore produced at temperatures above 50° C., particularly in improved flexibility, improved thermal stability, and improved resistance to traction and solvents.

The following examples illustrate the invention but do not limit the general application as elsewhere herein stated:

EXAMPLE 1

A glass-lined autoclave of 1 liter capacity provided with a magnetic agitator, with a jacket for the circulation of temperature controlling liquids, with a stainless steel cover provided with valves of inlet and discharge, and with a thermometer and a manometer, received 448 g. of water at 15° C. containing .56 g. of a suspension agent having a base of ethylhydroxyethyl-cellulose. 265 g. of vinyl chloride monomer were injected into the autoclave, of which 40 g. were to be released to purge the apparatus. 3.02 g. of alpha-chlorolauroyl peroxide in hexane containing 1.027 g. of active oxygen per 100 g. were added with the assistance of nitrogen pressure. Next the 40 g. of monomer were vented to sweep out the gas-filled part of the autoclave. The autoclave was about 67% full. The temperature was brought to 15° C., the agitator rotated at 350 r.p.m., the polymerization reaction continued 7 hours, the relative pressure did not exceed 1.9 bars. The product was in regular pearls having a diameter of about .5 mm. which were washed and dried. The overall yield was 75.5%, the hourly yield 10.8%. The Afnor viscosity index (NF–T 51–013) was 349.

EXAMPLE 2

A 20 liter stainless steel autoclave provided with an agitator received 10 liters of water, then 95 g. of an aqueous solution containing 6.8% of polyvinyl alcohol derived from the partial saponification of polyvinyl acetate. The autoclave was evacuated for 15 minutes, purged several times with gaseous vinyl chloride, 4.2 kg. of vinyl chloride monomer were injected, the temperature was adjusted to 12° C., and 122 cc. of alphachlorolauroyl peroxide in petroleum ether solution were added, providing 3.04 g./l. of active oxygen. The temperature was maintained at 12° C. and after four hours and eight hours of reaction, respectively, 60 g. of the polyvinyl alcohol solution were injected. After 24 hours of polymerization, the residual monomer was released and the product was dried. There were 2,865 g. of dried polymer having a viscosity of 440 measured in a .5% solution in cyclohexanone at 20° C.

EXAMPLE 3

A 100 liter stainless steel autoclave provided with an impeller rotatable at 160 r.p.m. received 50 liters of water and 1,100 g. of an aqueous solution containing 6.8% of polyvinyl alcohol. After cooling at +12° C., 550 g. of a solution of alpha-chlorolauroyl peroxide in petroleum ether were injected, providing .9% by weight of active oxygen. The autoclave was thereafter purged four times with gaseous monomer and 25 kg. of vinyl chloride monomer were injected, the temperature being brought to 12° C. After 15 hours of polymerization at this temperature the unpolymerized monomer was vented and the product was dried. The yield was 22.5 kg. of dried polymer, an overall yield of 90%, of which the Afnor index of viscosity was 320.

Although the bromo, and iodolauroyl peroxides are useful as catalysts in this invention, the chlorine substituted lauroyl peroxides yield preferred results.

A major advantage of the invention is the production of homopolymers and copolymers of vinyl chloride having greater molecular mass than polymers made at upward of 50° C., a particular advantage being that the product is superior to those produced from like monomers at 50 to 70° C. employing lauroyl peroxide as a catalyst.

As many apparently widely different embodiments of the present invention may be made without departing from the spirit and scope thereof, it is to be understood that the invention is not limited to the specific embodiments.

What is claimed is:
1. A method of polymerizing monomeric compositions containing at least a preponderant part of vinyl chloride, which comprises suspending the monomeric composition in an aqueous solution and mixing therewith a catalyst which furnishes active oxygen for polymerization having the formula

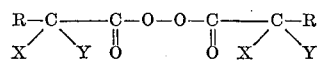

in which R is a saturated aliphatic radical of 10 carbon atoms, X is selected from the group consisting of hydrogen and chlorine, Y is chlorine, in proportions expressed in terms of the weight of active oxygen supplied by said catalyst, of from 0.001% to 0.1% in relation to the weight of the monomeric composition, and polymerizing the monomeric composition while agitating at a temperature from about 5 to about 35° C.

2. The method of claim 1 in which the catalyst proportion is preferably from 0.006 to 0.015% of active oxygen by weight of the monomeric composition.

3. The method of claim 1 in which the temperature is preferably from about 10 to about 25° C.

4. The method of claim 1 in which the catalyst is the α-chlorolauryl peroxide having the formula

5. The method of claim 1 in which the monomeric composition contains vinyl chloride alone.

6. A method according to claim 1 in which the monomeric composition comprises vinyl chloride and a monomer selected from the group consisting of the organic vinyl esters, the vinyl ethers, 1,1- and 1,2-dichloroethylene, trichloroethylene, monochlorotrifluoroethylene, acrylonitrile, chloroprene, propenyl chloride, and the esters of fumaric acid.

References Cited

UNITED STATES PATENTS 3,089,865   5/1963   Walther et al.

HARRY WONG, Jr., Primary Examiner

U.S. Cl. X.R.

260—85.5, 87.1, 87.5, 92.8